United States Patent
Takasaki

(10) Patent No.: US 11,440,434 B2
(45) Date of Patent: Sep. 13, 2022

(54) HYBRID VEHICLE AND METHOD FOR CONTROLLING HYBRID VEHICLE

(71) Applicant: TOYOTA JIDOSHA KABUSHIKI KAISHA, Toyota (JP)

(72) Inventor: Asuka Takasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 277 days.

(21) Appl. No.: 16/902,229

(22) Filed: Jun. 15, 2020

(65) Prior Publication Data
US 2021/0016679 A1     Jan. 21, 2021

(30) Foreign Application Priority Data

Jul. 17, 2019   (JP) ............................. JP2019-131754

(51) Int. Cl.
| | |
|---|---|
| *B60L 58/14* | (2019.01) |
| *B60K 6/28* | (2007.10) |
| *B60K 6/26* | (2007.10) |
| *B60K 6/32* | (2007.10) |
| *B60L 50/75* | (2019.01) |

(52) U.S. Cl.
CPC ............... *B60L 58/14* (2019.02); *B60K 6/26* (2013.01); *B60K 6/28* (2013.01); *B60K 6/32* (2013.01); *B60L 50/75* (2019.02)

(58) Field of Classification Search
None
See application file for complete search history.

(56) References Cited

U.S. PATENT DOCUMENTS

| | | | | |
|---|---|---|---|---|
| 6,318,487 | B2* | 11/2001 | Yanase | B60K 6/46 180/65.245 |
| 8,630,759 | B2* | 1/2014 | Bauerle | B60L 7/18 903/907 |
| 9,205,839 | B2* | 12/2015 | Lennevi | B60L 7/16 |
| 9,233,613 | B2* | 1/2016 | Kusumi | B60L 58/16 |
| 9,527,389 | B2* | 12/2016 | Huh | B60L 15/2009 |
| 9,566,976 | B2* | 2/2017 | Fujishiro | B60W 20/14 |
| 10,160,443 | B2* | 12/2018 | Sugimoto | B60W 10/26 |
| 11,021,145 | B2* | 6/2021 | Yui | B60L 50/16 |
| 11,312,358 | B2* | 4/2022 | Yui | B60W 10/08 |

FOREIGN PATENT DOCUMENTS

| | | | |
|---|---|---|---|
| JP | 2005-312243 A | 11/2005 | |
| JP | 2006032169 A * | 2/2006 | |
| JP | 4984808 B2 * | 7/2012 | |
| JP | 2013-099081 A | 5/2013 | |
| JP | 5754346 B2 * | 7/2015 | |
| JP | 2018020647 A * | 2/2018 | ............. B60K 6/445 |
| KR | 20060000647 A * | 1/2006 | |
| WO | WO-2012077416 A1 * | 6/2012 | ............. B60K 6/48 |
| WO | WO-2019116586 A1 * | 6/2019 | ............. B60K 6/46 |

* cited by examiner

*Primary Examiner* — Dirk Wright
(74) *Attorney, Agent, or Firm* — Hunton Andrews Kurth LLP

(57) ABSTRACT

A hybrid vehicle includes an electric generator, a drive motor, a power storage device, a power consuming device, and a controller. The controller is configured to control driving of the power consuming device. The controller is configured to execute power consumption increasing control when a vehicle power balance value is larger than a first threshold while the drive motor operates in a braking-period power generation mode.

7 Claims, 8 Drawing Sheets

HYBRID VEHICLE AND METHOD FOR CONTROLLING HYBRID VEHICLE

INCORPORATION BY REFERENCE

The disclosure of Japanese Patent Application No. 2019-131754 filed on Jul. 17, 2019 including the specification, drawings and abstract is incorporated herein by reference in its entirety.

BACKGROUND

1. Technical Field

The present disclosure relates to a hybrid vehicle and a method for controlling the hybrid vehicle.

2. Description of Related Art

In a fuel cell vehicle including a fuel cell, when electric power generated by a drive motor during braking is larger than chargeable power of a power storage device, surplus electric power that cannot be stored in the power storage device may be generated. There is known a configuration in which power consuming means consumes the surplus electric power (see, for example, Japanese Unexamined Patent Application Publication No. 2013-099081 (JP 2013-099081 A)).

SUMMARY

Required power of the vehicle may vary depending on, for example, a change in traveling conditions of the vehicle. The condition of the power storage device may vary as well. The variations of the required power and the condition of the power storage device may influence electric power balance of the fuel cell vehicle. Therefore, there is a demand for a technology of balancing generation and consumption of electric power in the fuel cell vehicle even if the required power or the condition of the power storage device varies during control for causing the power consuming device to consume the surplus electric power. Such a challenge is not limited to the fuel cell vehicle, but may be common to hybrid vehicles each including an energy generator configured to generate energy for driving the vehicle, a power storage device, and a drive motor, and each configured to obtain a braking force by causing the drive motor to generate electric power during braking of the vehicle.

The present disclosure can be embodied in the following form.

A hybrid vehicle according to first aspect of the present disclosure includes an electric generator, a drive motor, a power storage device, a power consuming device, and a controller. The electric generator is configured to generate electric power for driving the hybrid vehicle. The drive motor is configured to operate in any one mode out of a power running mode in which the drive motor drives the hybrid vehicle and a braking-period power generation mode in which the drive motor generates braking-period electric power by operating as a generator and generates a braking force for the hybrid vehicle. The power storage device is configured to store the electric power generated by the electric generator and the braking-period electric power generated by the drive motor. The power consuming device is configured to consume electric power. The controller is configured to control driving of the power consuming device. The controller is configured to execute power consumption increasing control when a vehicle power balance value is larger than a first threshold while the drive motor operates in the braking-period power generation mode. The vehicle power balance value is a vehicle power balance value that does not include a charging/discharging amount of the power storage device and that is obtained by subtracting vehicle-consuming power consumed by the hybrid vehicle from vehicle-generating power. The vehicle-generating power is electric power generated by the hybrid vehicle, including an estimated value of the braking-period electric power. The power consumption increasing control is control for setting power consumption of the power consuming device to be larger than power consumption of the power consuming device at the vehicle power balance value that is smaller than a second threshold set smaller than the first threshold. The first threshold is preset based on a permissible dischargeable power, which is determined depending on a condition of the power storage device as an upper limit of electric power to be discharged by the power storage device. The first threshold at the permissible dischargeable power that is smaller than a predetermined first reference power value is set larger than the first threshold at the permissible dischargeable power that is equal to or larger than the first reference power value. The second threshold at the permissible dischargeable power that is smaller than the first reference power value is set larger than the second threshold at the permissible dischargeable power that is equal to or larger than the first reference power value. The controller is configured to terminate the power consumption increasing control when the vehicle power balance value is smaller than the second threshold after a start of the power consumption increasing control.

In the hybrid vehicle according to the first aspect of the present disclosure, when the power consumption increasing control for increasing the power consumption of the power consuming device during braking of the vehicle is executed, the second threshold, which is the reference value of the vehicle power balance value for terminating the power consumption increasing control, is set smaller than the first threshold, which is the reference value of the vehicle power balance value for starting the power consumption increasing control. The first threshold and the second threshold at the permissible dischargeable power smaller than the first reference power value are larger than the first threshold and the second threshold at the permissible dischargeable power equal to or larger than the first reference power value, respectively. Thus, the generation and consumption of electric power can further be balanced in the hybrid vehicle even if the required power of the vehicle or the condition of the power storage device varies when the power consumption increasing control is executed.

In the hybrid vehicle according to the first aspect of the present disclosure, the first threshold at the permissible dischargeable power that is smaller than the first reference power value and larger than a second reference power value that is smaller than the first reference power value may be set to increase as the permissible dischargeable power decreases. The second threshold at the permissible dischargeable power that is smaller than the first reference power value and larger than the second reference power value may be set to increase as the permissible dischargeable power decreases.

In the hybrid vehicle according to the first aspect of the present disclosure, as the permissible dischargeable power decreases, deficiency of electric power in the hybrid vehicle due to the execution of the power consumption increasing control can be suppressed before the power consumption increasing control is terminated.

In the hybrid vehicle according to the first aspect of the present disclosure, the controller may be configured such that, when a predetermined first reference time elapses without starting the power consumption increasing control after a termination of the power consumption increasing control, the first threshold is set to zero until the power consumption increasing control is started subsequently.

In the hybrid vehicle according to the first aspect of the present disclosure, even in a case where the vehicle power balance value may remain positive unless the first threshold is set to zero, an excessive increase in electric power can be suppressed by starting the power consumption increasing control for the power consuming device.

In the hybrid vehicle according to the first aspect of the present disclosure, the controller may be configured such that, when a predetermined second reference time or longer elapses while the vehicle power balance value remains equal to or larger than the second threshold and equal to or smaller than the first threshold without executing the power consumption increasing control, the first threshold is set to zero until the power consumption increasing control is started subsequently.

In the hybrid vehicle according to the first aspect of the present disclosure, even in a case where the vehicle power balance value may remain positive unless the first threshold is set to zero, an excessive increase in electric power can be suppressed by starting the power consumption increasing control for the power consuming device.

In the hybrid vehicle according to the first aspect of the present disclosure, the controller may be configured such that, when a predetermined third reference time elapses without terminating the power consumption increasing control after a start of the power consumption increasing control, the second threshold is set to zero until the power consumption increasing control is terminated subsequently.

In the hybrid vehicle according to the first aspect of the present disclosure, even in a case where the vehicle power balance value may remain negative unless the second threshold is set to zero, deficiency of electric power due to the power consumption of the power consuming device can be suppressed by terminating the power consumption increasing control for the power consuming device.

In the hybrid vehicle according to the first aspect of the present disclosure, the controller may be configured such that, when a predetermined fourth reference time or longer elapses while the vehicle power balance value remains equal to or larger than the second threshold and equal to or smaller than the first threshold under execution of the power consumption increasing control, the second threshold is set to zero until the power consumption increasing control is terminated subsequently.

In the hybrid vehicle according to the first aspect of the present disclosure, even in a case where the vehicle power balance value may remain negative unless the second threshold is set to zero, deficiency of electric power due to the power consumption of the power consuming device can be suppressed by terminating the power consumption increasing control for the power consuming device.

In a method for controlling a hybrid vehicle according to the second aspect of the present disclosure, the hybrid vehicle including an electric generator configured to generate electric power for driving the hybrid vehicle, a drive motor configured to operate in any one of a power running mode in which the drive motor drives the hybrid vehicle and a braking-period power generation mode in which the drive motor generates braking-period electric power by operating as a generator and generates a braking force for the hybrid vehicle, a power storage device configured to store the electric power generated by the electric generator and the braking-period electric power generated by the drive motor, and a power consuming device configured to consume electric power. The method for controlling the hybrid vehicle comprising executing power consumption increasing control when a vehicle power balance value is larger than a first threshold while the drive motor operates in the braking-period power generation mode, and terminating the power consumption increasing control when the vehicle power balance value is smaller than the second threshold after a start of the power consumption increasing control. The vehicle power balance value being a vehicle power balance value that does not include a charging and discharging amount of the power storage device and that is obtained by subtracting vehicle-consuming power consumed by the hybrid vehicle from vehicle-generating power. The vehicle-generating power being electric power generated by the hybrid vehicle, including an estimated value of the braking-period electric power. The power consumption increasing control being control for setting power consumption of the power consuming device to be larger than power consumption of the power consuming device at the vehicle power balance value that is smaller than a second threshold set smaller than the first threshold. The first threshold being preset based on a permissible dischargeable power, which is determined depending on a condition of the power storage device as an upper limit of electric power to be discharged by the power storage device. The first threshold at the permissible dischargeable power that is smaller than a predetermined first reference power value being set larger than the first threshold at the permissible dischargeable power that is equal to or larger than the first reference power value. The second threshold at the permissible dischargeable power that is smaller than the first reference power value being set larger than the second threshold at the permissible dischargeable power that is equal to or larger than the first reference power value.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. First Embodiment (A-1) Overall Configuration of Fuel Cell Vehicle

Figure 1:
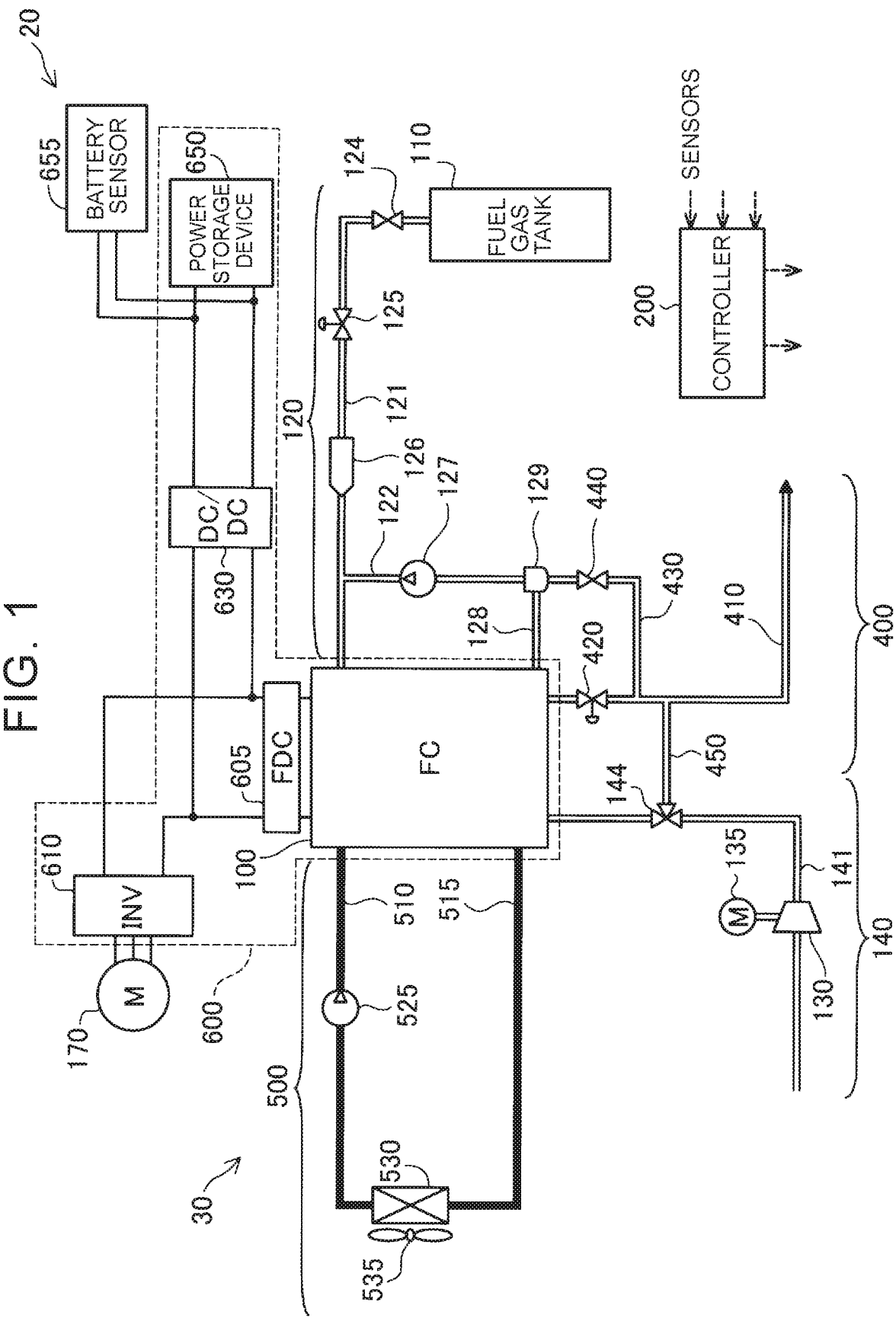
FIG. 1 is an explanatory drawing schematically illustrating the overall configuration of a fuel cell vehicle.

FIG. 1 is an explanatory drawing schematically illustrating the overall configuration of a fuel cell vehicle 20 according to a first embodiment of the present disclosure. The fuel cell vehicle 20 includes a fuel cell system 30, a power circuit 600, a drive motor 170, and a controller 200. The fuel cell system 30 is mounted on the fuel cell vehicle 20 as a driving power supply, and includes a fuel cell (an electric generator) 100, a fuel gas supply system 120, an oxidant gas supply system 140, an exhaust gas system 400, and a cooling system 500.

The fuel cell 100 has a stack structure including a plurality of stacked single cells. The fuel cell 100 of this embodiment is a polymer electrolyte fuel cell, but a solid oxide fuel cell or other types of fuel cell may be employed instead. In each single cell of the fuel cell 100, a channel where fuel gas flows (anode channel) is formed on an anode side that is one side of a proton exchange membrane, and a channel where oxidant gas flows (cathode channel) is formed on a cathode side that is the other side of the proton exchange membrane. Further, a coolant channel is formed inside the fuel cell 100. A coolant for cooling the fuel cell 100 flows through the coolant channel.

The fuel gas supply system 120 includes a fuel gas tank 110, a hydrogen supply channel 121, a fuel gas discharge channel 128, a circulation channel 122, a main stop valve 124, a regulator 125, an injector 126, a gas-liquid separator 129, and a circulation pump 127. The fuel gas tank 110 is a storage device that stores hydrogen gas as fuel gas, and is connected to the fuel cell 100 via the hydrogen supply channel 121. In the fuel gas supply system 120, the main stop valve 124 opens or closes the hydrogen supply channel 121, the regulator 125 reduces a pressure, and the injector 126 ejects the hydrogen gas such that the hydrogen gas stored in the fuel gas tank 110 is supplied to the anode channel of the fuel cell 100.

Anode off-gas discharged from the fuel cell 100 flows through the fuel gas discharge channel 128. The circulation channel 122 is connected to the fuel gas discharge channel 128 and to a part of the hydrogen supply channel 121 on a downstream side of the injector 126. The circulation pump 127 adjusts a pressure of hydrogen circulating through the circulation channel 122. The amount of fuel gas to be supplied to the fuel cell 100 is adjustable depending on drive amounts of the injector 126 and the circulation pump 127. The injector 126 and the circulation pump 127 are controlled by the controller 200.

The gas-liquid separator 129 is provided at a connecting portion between the fuel gas discharge channel 128 and the circulation channel 122. The gas-liquid separator 129 separates water and gas (including hydrogen and nitrogen) in the anode off-gas. In this embodiment, impurities including nitrogen and water vapor are removed from a channel including the circulation channel 122 via the gas-liquid separator 129 and a purge valve 440 provided on a fuel gas discharge channel 430 described later.

The oxidant gas supply system 140 includes a compressor 130, an oxidant gas supply channel 141, and a flow dividing valve 144. The fuel cell 100 of this embodiment uses air as oxidant gas. The compressor 130 is driven by an air compressor motor 135 to compress air, and supplies the air to the cathode channel of the fuel cell 100 via the oxidant gas supply channel 141. The flow dividing valve 144 is provided on the oxidant gas supply channel 141 at a connecting portion between the oxidant gas supply channel 141 and an oxidant gas bypass channel 450 described later, which is connected to the oxidant gas supply channel 141.

The exhaust gas system 400 includes an exhaust gas channel 410, a pressure regulating valve 420, the fuel gas discharge channel 430, the purge valve 440, and the oxidant gas bypass channel 450. Cathode off-gas is discharged from the fuel cell 100 through the exhaust gas channel 410. The pressure regulating valve 420 is provided on the exhaust gas channel 410, and adjusts a pressure of oxidant gas in the fuel cell 100. The fuel gas discharge channel 430 connects the gas-liquid separator 129 and the exhaust gas channel 410. The purge valve 440 is provided on the fuel gas discharge channel 430. When the concentration of nitrogen in the anode off-gas increases or when the amount of water in the gas-liquid separator 129 increases, the controller 200 opens the purge valve 440 to discharge water and gas from the gas-liquid separator 129. Thus, the concentration of impurities in the fuel gas circulating through the channel as described above is reduced. The fuel gas discharge channel 430 is connected to a part of the exhaust gas channel 410 on a downstream side of the pressure regulating valve 420. Hydrogen in the anode off-gas to be discharged via the purge valve 440 is thinned by the cathode off-gas prior to release into the atmosphere.

The oxidant gas bypass channel 450 connects the oxidant gas supply channel 141 and the exhaust gas channel 410. The flow dividing valve 144 is provided at the connecting portion between the oxidant gas bypass channel 450 and the oxidant gas supply channel 141.

The cooling system 500 includes a coolant supply channel 510, a coolant discharge channel 515, a coolant pump 525, and a radiator 530. A coolant is supplied to the fuel cell 100 through the coolant supply channel 510. The coolant pump 525 is arranged on the coolant supply channel 510 to adjust the flow rate of the coolant flowing through the channel. The coolant is discharged from the fuel cell 100 through the coolant discharge channel 515. The radiator 530 for cooling the coolant is provided between a downstream part of the coolant discharge channel 515 and an upstream part of the coolant supply channel 510. The radiator 530 is provided with a radiator fan 535. The radiator 530 cools the coolant by using air sent from the radiator fan 535 and air taken into the fuel cell vehicle 20 during traveling.

The power circuit 600 includes the fuel cell 100 that is also a part of the fuel cell system 30, a fuel cell (FC) boost converter 605 (FDC 605), an inverter 610, a battery converter 630, and a power storage device 650. Various fuel cell auxiliary devices and various vehicle auxiliary devices are connected to the power circuit 600 in addition to the drive motor 170. The power circuit 600 is provided with a current sensor and a voltage sensor configured to detect an output current and an output voltage of the fuel cell 100, respectively, thereby being capable of detecting output power of the fuel cell 100.

The FC boost converter 605 is a direct current-to-direct current (DC/DC) converter configured to step up the output voltage of the fuel cell 100 to a high voltage usable in the drive motor 170. The inverter 610 converts the DC voltage stepped up by the FC boost converter 605 into an alternating current (AC) voltage, and supplies the AC voltage to the drive motor 170. The drive motor 170 drives wheels of the vehicle, and is operable in a power running mode and a braking-period power generation mode. In the power running mode, the drive motor 170 performs a power running operation to drive the fuel cell vehicle 20. In the braking-period power generation mode, the drive motor 170 generates braking-period electric power described later by operating as a generator, and also generates a braking force for the fuel cell vehicle 20.

The battery converter 630 is a bidirectional DC/DC converter configured to step down a voltage stepped up by the FC boost converter 605 or a voltage generated by the drive motor 170 during braking of the vehicle and supply the voltage to the power storage device 650, or step up a voltage of the power storage device 650 and supply the voltage to the inverter 610. The power storage device 650 can store electric power generated by the fuel cell 100 and the braking-period electric power generated by the drive motor 170 during braking of the vehicle, and functions as a power supply configured to supply electric power to loads including the drive motor 170 and various auxiliary devices. The power storage device 650 of this embodiment is a rechargeable secondary battery. Examples of the secondary battery include a lithium ion battery and a nickel-metal hydride battery. The power storage device 650 may be any rechargeable device other than the secondary battery, as typified by a capacitor. The power storage device 650 is provided with a battery sensor 655 configured to detect operating conditions such as a voltage, current, and state of charge (SOC) of the power storage device 650.

The controller 200 is a microcomputer including a central processing unit (CPU), a read-only memory (ROM), a random-access memory (RAM), and input/output ports. The controller 200 controls power generation of the fuel cell system 30, and also controls the entire fuel cell vehicle 20 including the power circuit 600. The controller 200 acquires output signals from sensors provided in various parts of the fuel cell vehicle 20 (for example, sensors provided in various parts of the fuel cell system 30, an accelerator operation amount sensor, a shift position sensor, an outside temperature sensor, and a vehicle speed sensor). The controller 200 outputs drive signals to various parts related to power generation and running of the fuel cell vehicle 20. The controller 200 that performs the functions described above need not be a single controller. For example, the controller 200 may be constituted by a plurality of controllers, and the controllers may exchange necessary information. Examples of the controllers include a controller related to the operation of the fuel cell system 30, a controller related to running of the fuel cell vehicle 20, and a controller configured to control vehicle auxiliary devices that are not related to running.

(A-2) Operation During Braking

The fuel cell vehicle 20 of this embodiment has a feature in terms of control to be executed during braking. First, an overview of an operation of the fuel cell vehicle 20 during braking of the vehicle is described below.

When a brake is applied to the fuel cell vehicle 20, specifically, when the accelerator operation amount is zero while the vehicle is traveling, the drive motor 170 operates in the braking-period power generation mode as described above. The drive motor 170 brakes the fuel cell vehicle 20 by converting kinetic energy of the fuel cell vehicle 20 into electric power. The electric power generated by the drive motor 170 during braking of the vehicle is referred to also as "braking-period electric power".

When a brake is applied to the vehicle, that is, when the accelerator operation amount is zero while the vehicle is traveling, required power of the fuel cell 100 is zero. When power generation in the fuel cell 100 is stopped while air is remaining in the fuel cell 100, a cathode potential increases extremely, and deterioration of an electrode catalyst may advance. In this embodiment, when a brake is applied to the vehicle, an excessive increase in the cathode potential is suppressed by setting an upper limit of the output voltage of the fuel cell 100 to a high potential avoidance voltage $V_{Fc}$ determined in advance as a permissible voltage, and sweeping an infinitesimal current from the fuel cell 100. At this time, air supply to the fuel cell 100 may be stopped, or air may be supplied to the fuel cell 100 in a reduced amount as compared to the amount during normal power generation. The power generation in the fuel cell 100 for sweeping the infinitesimal current while setting the high potential avoidance voltage $V_{Fc}$ as the upper limit voltage during braking of the vehicle is referred to also as "infinitesimal power generation".

As described above, during the braking of the fuel cell vehicle 20, the drive motor 170 can generate the braking-period electric power, and the fuel cell 100 can perform the infinitesimal power generation with the high potential avoidance voltage $V_{Fc}$ set as the upper limit voltage. In this embodiment, a "vehicle power balance value" indicating electric power balance in the fuel cell vehicle 20 can be defined as a "value that does not include the charging/discharging amount of the power storage device 650 and that is obtained by subtracting electric power consumed by the fuel cell vehicle 20 from vehicle-generating power, which is electric power generated by the fuel cell vehicle 20, including an estimated value of the braking-period electric power".

A vehicle power balance value Wa during the braking of the fuel cell vehicle 20 can be represented by Expression (1). In Expression (1), Wr represents a value derived as braking-period electric power to be generated by the drive motor 170 when the accelerator is OFF. The braking-period electric power Wr is not actually generated currently, but is an estimated value of electric power to be generated by the drive motor 170 and is derived prior to calculation of the vehicle power balance value Wa by using, for example, a vehicle speed when the accelerator is OFF. For example, the braking-period electric power Wr can be determined by prestoring a map showing relationships between parameters including the vehicle speed and braking-period electric power to be generated, and referring to the map when acquiring the parameters including the vehicle speed. In Expression (1), Ws represents electric power generated through the infinitesimal power generation in the fuel cell 100. In Expression (1), We represents auxiliary device power consumption, which is electric power consumed by the auxiliary devices mounted on the fuel cell vehicle 20. After the fuel cell vehicle 20 starts power consumption increasing control for a power consuming device described later, the auxiliary device power consumption We in Expression (1) includes increased power consumption of the power consuming device. The sum of the braking-period electric power Wr and the electric power Ws generated through the infinitesimal power generation is referred to also as "vehicle-generating power". The auxiliary device power consumption We is referred to also as "vehicle-consuming power" during braking. Any auxiliary device whose power consumption is negligible may be ignored in the calculation of the auxiliary device power consumption We in Expression (1).

$$Wa = Wr + Ws - We \qquad (1)$$

When the vehicle power balance value Wa is positive, the power storage device 650 is charged with the vehicle power balance value Wa, that is, surplus electric power that is not consumed by the auxiliary devices in the electric power generated by the fuel cell vehicle 20. Permissible chargeable power Win is set in the power storage device 650. When the vehicle power balance value Wa is equal to or smaller than the permissible chargeable power Win, the power storage device 650 can be charged with the surplus electric power without trouble. The permissible chargeable power Win is a value determined depending on the condition of the power storage device 650 as an upper limit of chargeable power of the power storage device 650, and indicates charging performance of the power storage device 650. As the permissible chargeable power Win increases, the charging performance increases, which means that the power storage device 650 can be charged with more electric power.

When the vehicle power balance value Wa is negative, the vehicle power balance value Wa, that is, electric power that is consumed by the auxiliary devices of the fuel cell vehicle 20 but is insufficient with the braking-period electric power Wr and the electric power Ws generated through the infinitesimal power generation is covered by electric power output from the power storage device 650. Permissible dischargeable power Wout is set in the power storage device 650. When the absolute value of the vehicle power balance value Wa is equal to or smaller than the permissible dischargeable power Wout, electric power corresponding to the deficiency can be supplied from the power storage device 650 without trouble. The permissible dischargeable power Wout is a value determined depending on the condition of the power storage device 650 as an upper limit of output power of the power storage device 650, and indicates discharging performance of the power storage device 650. As the permissible dischargeable power Wout increases, the discharging performance increases, which means that the power storage device 650 can output more electric power.

Each of the permissible chargeable power Win and the permissible dischargeable power Wout is a value determined by the state of charge (SOC) and the temperature of the power storage device 650. In this embodiment, relationships between the permissible chargeable power Win and the state of charge and the temperature of the power storage device 650 and relationships between the permissible dischargeable power Wout and the state of charge and the temperature of the power storage device 650 are determined in advance for each fuel cell 100, and maps showing the relationships is prestored in the memory of the controller 200. The controller 200 acquires the permissible chargeable power Win and the permissible dischargeable power Wout by acquiring the state of charge of the power storage device 650 from the battery sensor 655, acquiring the temperature of the power storage device 650 from a temperature sensor (not illustrated), and referring to the maps.

(A-3) Power Consumption Increasing Control for Power Consuming Device

Figure 2:
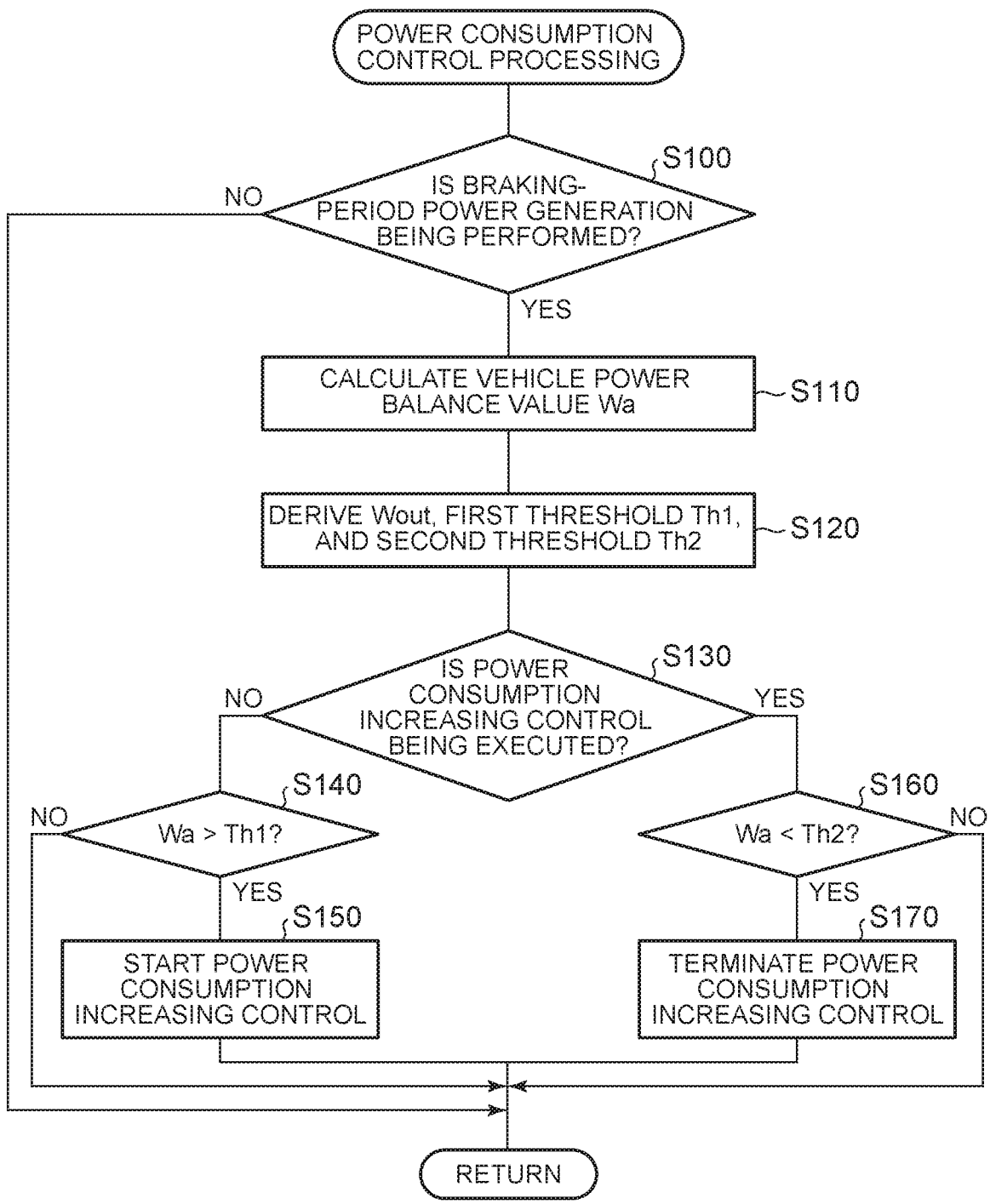
FIG. 2 is a flowchart illustrating a power consumption control processing routine.

FIG. 2 is a flowchart illustrating a power consumption control processing routine to be executed by the controller 200 of the fuel cell vehicle 20. This routine is started when an instruction to start the fuel cell system 30 is input such that the fuel cell vehicle 20 can travel, specifically, when a driver pushes a start switch (not illustrated), and is repeated until a stop instruction is input (for example, the driver turns OFF the start switch).

Figure 3:
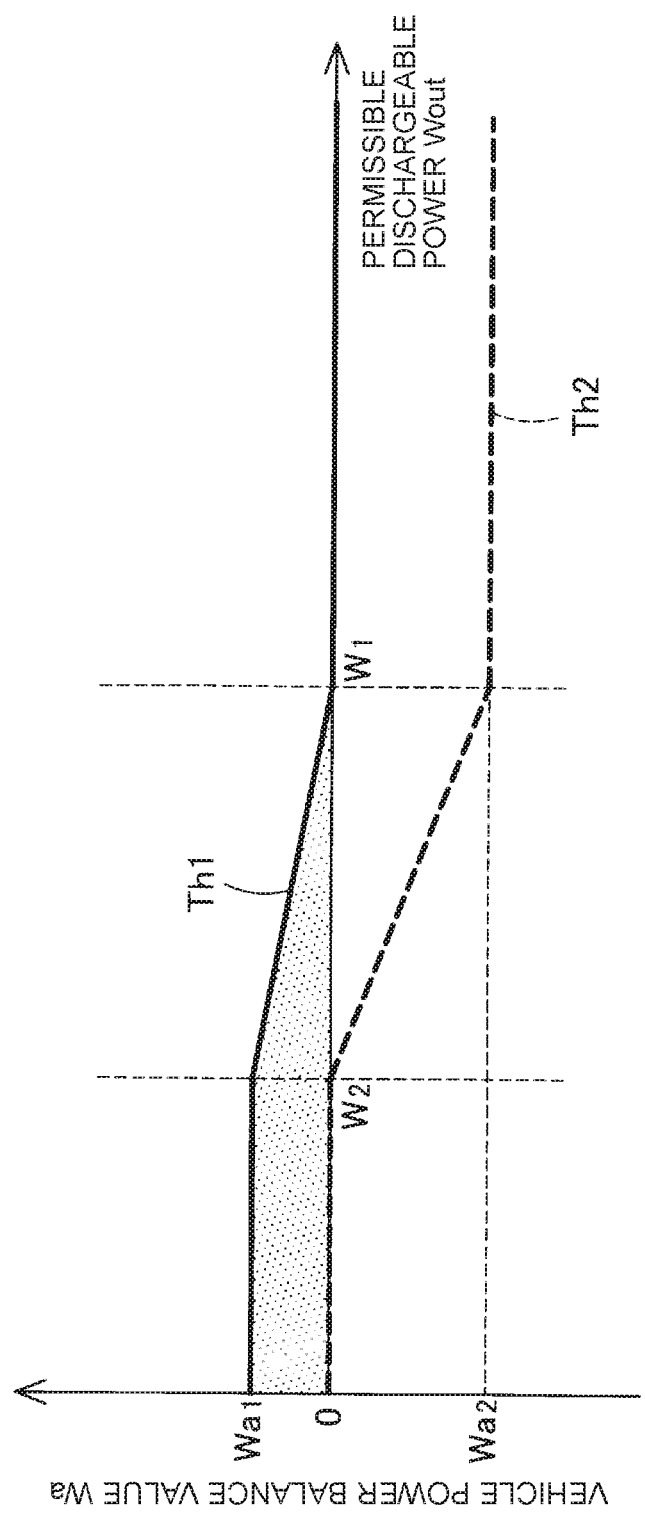
FIG. 3 is an explanatory drawing illustrating conditions for starting and terminating power consumption increasing control for a power consuming device.

FIG. 3 is an explanatory drawing illustrating conditions for starting and terminating the power consumption increasing control for the power consuming device in the fuel cell vehicle 20. The power consumption increasing control for the power consuming device is described below with reference to FIG. 2 and FIG. 3.

When the power consumption control processing routine of FIG. 2 is started, the CPU of the controller 200 determines whether the fuel cell vehicle 20 is performing braking-period power generation, that is, whether a brake is being applied to the fuel cell vehicle 20 and the drive motor 170 is generating braking-period electric power (Step S100). When determination is made that the braking-period power generation is not being performed (Step S100: NO), the CPU of the controller 200 terminates this routine.

When determination is made in Step S100 that the braking-period power generation is being performed (Step S100: YES), the CPU of the controller 200 calculates the vehicle power balance value Wa (Step S110). The vehicle power balance value Wa can be calculated by using Expression (1). In Expression (1), the braking-period electric power Wr is a value estimated by using, for example, a vehicle speed when the accelerator is OFF as electric power to be generated by the drive motor 170 during braking. Therefore, the braking-period electric power Wr may be unequal to electric power that is actually generated by the drive motor 170. For example, when the vehicle power balance value Wa is positive and surplus electric power is generated as described later, the electric power that is actually generated by the drive motor 170 during braking may be smaller than the braking-period electric power Wr.

When the vehicle power balance value Wa is calculated in Step S110, the CPU of the controller 200 derives the permissible dischargeable power Wout of the power storage device 650, a first threshold Th1, and a second threshold Th2 (Step S120). As described above, the permissible dischargeable power Wout can be determined by detecting the state of charge and the temperature of the power storage device 650. The first threshold Th1 is a reference value of the vehicle power balance value Wa for starting the power consumption increasing control for the power consuming device. The second threshold Th2 is a reference value of the vehicle power balance value Wa for terminating the power consumption increasing control for the power consuming device after the power consumption increasing control is started. The first threshold Th1 and the second threshold Th2 are values determined based on the permissible dischargeable power Wout.

The power consumption increasing control for the power consuming device is executed such that, when the braking-period electric power Wr generated by the drive motor 170 during braking of the vehicle is excessive and therefore the vehicle power balance value Wa may be excessive, the power consumption of the power consuming device mounted on the fuel cell vehicle 20 is larger than the power consumption of the power consuming device at a vehicle power balance value Wa smaller than the second threshold Th2. The power consuming device only needs to consume electric power during the braking of the fuel cell vehicle 20, and examples of the power consuming device include fuel cell auxiliary devices such as the compressor 130, the coolant pump 525, the radiator fan 535, and the circulation pump 127, and vehicle auxiliary devices such as an electric heater configured to heat hot water for warming the vehicle. Alternatively, a dedicated power consuming device configured to consume the vehicle power balance value Wa may be mounted on the fuel cell vehicle 20. For example, when the compressor 130 is used as the power consuming device and is stopped in normal control during the braking of the vehicle, it is appropriate that driving of the compressor 130 be started for the power consumption increasing control and the flow dividing valve 144 be switched such that air discharged from the compressor 130 fully flows through the oxidant gas bypass channel 450 without flowing into the fuel cell 100. Thus, when the power consumption increasing control is executed, it is appropriate that the respective parts be controlled as appropriate so as to reduce influence on the fuel cell vehicle 20 along with an increase in the power consumption of the power consuming device. The "power consumption increasing control to be executed such that the power consumption of the power consuming device is larger than the power consumption of the power consuming device at a vehicle power balance value Wa equal to or smaller than the first threshold Th1" includes control for starting the driving of the power consuming device when the power consuming device is stopped before the start of the power consumption increasing control. When the power consumption increasing control is executed, the driving of the power consuming device is desirably controlled such that the power consumption of the power consuming device is equal to the vehicle power balance value Wa, that is, the power consuming device consumes excessive electric power obtained by subtracting the vehicle-consuming power from the vehicle-generating power in the fuel cell vehicle 20. Thus, the generation and consumption of electric power can be balanced in the fuel cell vehicle 20.

The controller 200 of this embodiment prestores a map illustrated in FIG. 3 as relationships between the first threshold Th1 and the permissible dischargeable power Wout and between the second threshold Th2 and the permissible dischargeable power Wout. In Step S120, the controller 200 refers to the map of FIG. 3 to derive the first threshold Th1 and the second threshold Th2 associated with a value of the permissible dischargeable power Wout at the time of execution of Step S120. As illustrated in FIG. 3, in this embodiment, the first threshold Th1, which is the reference value of the vehicle power balance value Wa for starting the power consumption increasing control, is set larger than the second threshold Th2, which is the reference value of the vehicle power balance value Wa for terminating the started power consumption increasing control. In this embodiment, the power consumption increasing control for the power consuming device is started when the vehicle power balance value Wa increases above the first threshold Th1, and is terminated when the vehicle power balance value Wa decreases below the second threshold Th2 after the start of the power consumption increasing control. As illustrated in FIG. 3, a hysteresis is set between the first threshold Th1 and the second threshold Th2. Thus, hunting can be suppressed in the operation of starting and terminating the power consumption increasing control. The difference between the first threshold Th1 and the second threshold Th2 need not be constant over the entire range of the permissible dischargeable power Wout. It is only necessary that the first threshold Th1 be larger than the second threshold Th2.

In this embodiment, as illustrated in FIG. 3, a first threshold Th1 at a permissible dischargeable power Wout smaller than a predetermined first reference power value $W_1$ is larger than a first threshold Th1 at a permissible dischargeable power Wout larger than the first reference power value $W_1$. A second threshold Th2 at the permissible dischargeable power Wout smaller than the first reference power value $W_1$ is larger than a second threshold Th2 at the permissible dischargeable power Wout larger than the first reference power value $W_1$. Particularly in this embodiment, a first threshold Th1 at a permissible dischargeable power Wout smaller than the first reference power value $W_1$ and larger than a second reference power value $W_2$ that is smaller than the first reference power value $W_1$ increases as the permissible dischargeable power Wout decreases. A second threshold Th2 at the permissible dischargeable power Wout smaller than the first reference power value $W_1$ and larger than the second reference power value $W_2$ increases as the permissible dischargeable power Wout decreases.

After the permissible dischargeable power Wout, the first threshold Th1, and the second threshold Th2 are derived in Step S120, the CPU of the controller 200 determines whether the fuel cell vehicle 20 is already executing the power consumption increasing control (Step S130). When determination is made that the power consumption increasing control is not being executed (Step S130: NO), the CPU of the controller 200 determines whether the vehicle power balance value Wa is larger than the first threshold Th1 (Step S140). When determination is made that the vehicle power balance value Wa is equal to or smaller than the first threshold Th1 (Step S140: NO), the CPU of the controller 200 terminates this routine. Thus, the power consumption increasing control remains unexecuted. When determination is made that the vehicle power balance value Wa is larger than the first threshold Th1 (Step S140: YES), the CPU of the controller 200 starts the power consumption increasing control (Step S150), and then terminates this routine. By starting the power consumption increasing control, the power consuming device starts consuming electric power, or the power consumption of the power consuming device is larger than that before the start of the power consumption increasing control.

When determination is made in Step S130 that the power consumption increasing control is being executed (Step S130: YES), the CPU of the controller 200 determines whether the vehicle power balance value Wa is smaller than the second threshold Th2 (Step S160). When determination is made that the vehicle power balance value Wa is equal to or larger than the second threshold Th2 (Step S160: NO), the CPU of the controller 200 terminates this routine. Thus, the power consumption increasing control remains executed. When determination is made that the vehicle power balance value Wa is smaller than the second threshold Th2 (Step S160: YES), the CPU of the controller 200 terminates the power consumption increasing control (Step S170), and then terminates this routine. By terminating the power consumption increasing control, the power consuming device stops consuming electric power, or the power consumption of the power consuming device is reduced.

According to the fuel cell vehicle 20 of this embodiment that is configured as described above, when the power consumption increasing control for causing the power consuming device to consume surplus electric power of the vehicle during the braking of the vehicle is executed, the second threshold Th2, which is the reference value of the vehicle power balance value Wa for terminating the power consumption increasing control, is set smaller than the first threshold Th1, which is the reference value of the vehicle power balance value Wa for starting the power consumption increasing control, and the hysteresis is set between the first threshold Th1 and the second threshold Th2. The first threshold Th1 and the second threshold Th2 at the permissible dischargeable power Wout of the power storage device 650 that is smaller than the first reference power value $W_1$ are larger than the first threshold Th1 and the second threshold Th2 at the permissible dischargeable power Wout equal to or larger than the first reference power value $W_1$, respectively. Thus, the generation and consumption of electric power can further be balanced in the fuel cell vehicle 20 even if the required power of the vehicle or the condition of the power storage device 650 varies when the power consumption increasing control is executed.

Specifically, when the vehicle power balance value Wa is positive, that is, when the vehicle has surplus electric power and is executing the power consumption increasing control for the power consuming device and when the permissible dischargeable power Wout of the power storage device 650 is smaller than the first reference power value $W_1$, the power consumption increasing control can be terminated more promptly in response to a decrease in the vehicle power balance value Wa to a negative value. As a result, deficiency of electric power in the fuel cell vehicle 20 is suppressed when the vehicle power balance value Wa changes into a negative value. Thus, the generation and consumption of electric power can further be balanced.

Figure 4:
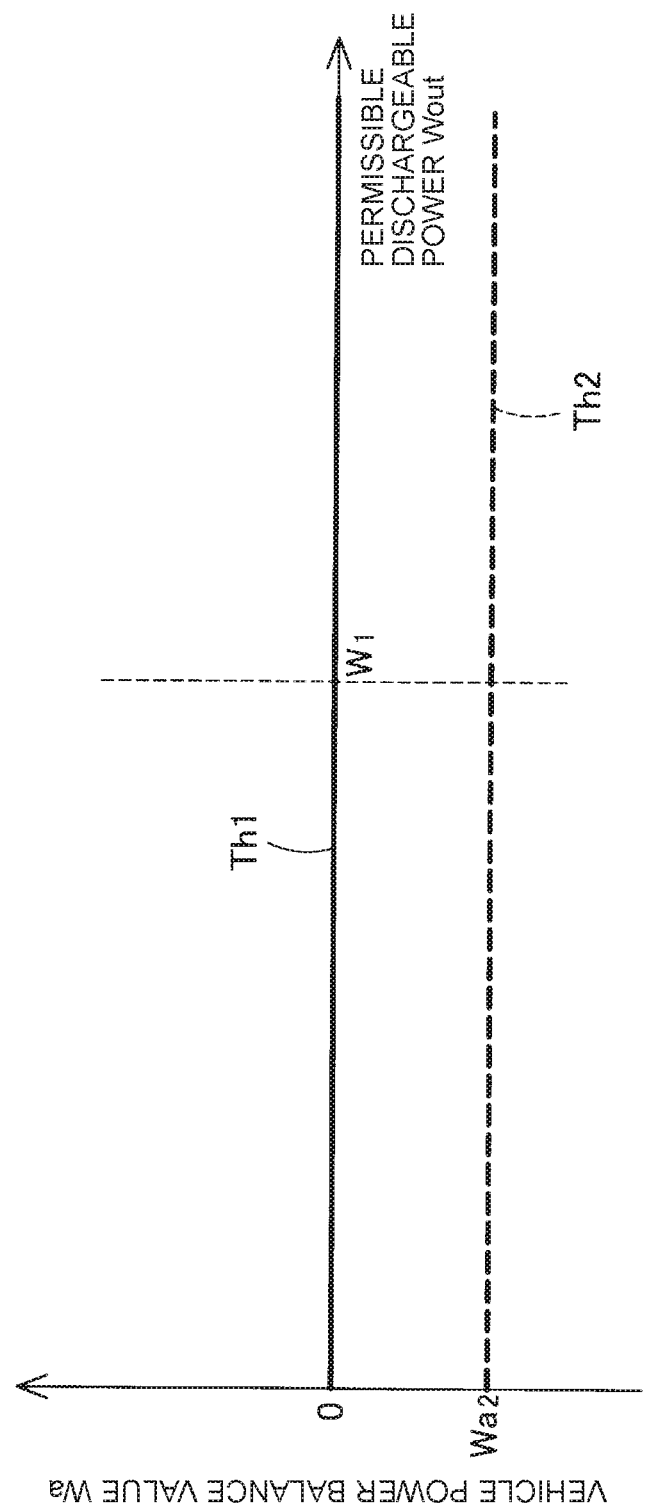
FIG. 4 is an explanatory drawing illustrating conditions for starting and terminating the power consumption increasing control in a comparative example.

FIG. 4 is an explanatory drawing illustrating conditions for starting and terminating the power consumption increasing control in a comparative example. In FIG. 4, the first threshold Th1, which is the reference value of the vehicle power balance value Wa for starting the power consumption increasing control, is set to zero irrespective of the value of the permissible dischargeable power Wout. The second threshold Th2, which is the reference value of the vehicle power balance value Wa for terminating the power consumption increasing control, is set to a constant negative value $Wa_2$ irrespective of the value of the permissible dischargeable power Wout.

When the permissible dischargeable power Wout is relatively large, specifically, when the permissible dischargeable power Wout is larger than the first reference power value $W_1$, the first threshold Th1 is zero and the second threshold Th2 is the value $Wa_2$ both in this embodiment illustrated in FIG. 3 and in the comparative example illustrated in FIG. 4. When the vehicle power balance value Wa is positive and the vehicle has surplus electric power, the power consumption increasing control is started as a result of a vehicle power balance value Wa becoming larger than the first threshold Th1. Therefore, the power consuming device can consume the surplus electric power. When the vehicle power balance value Wa decreases to a negative value after the start of the power consumption increasing control, the power consumption increasing control is not terminated unless the vehicle power balance value Wa decreases to the value $Wa_2$ that is the second threshold Th2. Therefore, the electric power of the fuel cell vehicle 20 is insufficient. When the permissible dischargeable power Wout is larger than the first reference power value $W_1$, the permissible dischargeable power Wout is relatively large, and therefore the electric power corresponding to the negative vehicle power balance value Wa can be supplied by discharging from the power storage device 650. Thus, the generation and consumption of electric power can be balanced in the fuel cell vehicle 20.

When the permissible dischargeable power Wout is relatively small, specifically, when the permissible dischargeable power Wout is smaller than the first reference power value $W_1$, the first threshold Th1 is larger than zero and the second threshold Th2 is larger than the value $Wa_2$ in this embodiment. In the fuel cell vehicle 20 of this embodiment, when the vehicle power balance value Wa decreases after the start of the power consumption increasing control for the power consuming device, the vehicle power balance value Wa decreases to the second threshold Th2 more promptly than that in the comparative example of FIG. 4. Therefore, the power consumption increasing control can be terminated. Thus, deficiency of electric power in the fuel cell vehicle 20 can be suppressed, and the generation and consumption of electric power can be balanced.

When the vehicle power balance value Wa is negative until the power consumption increasing control is terminated after the start of the power consumption increasing control, it may be more difficult for the power storage device 650 to supply electric power corresponding to the deficiency in the fuel cell vehicle 20, that is, the vehicle power balance value Wa as the permissible dischargeable power Wout decreases. In this embodiment, when the permissible dischargeable power Wout is smaller than the first reference power value $W_1$ and larger than the second reference power value $W_2$ that is smaller than the first reference power value $W_1$, the second threshold Th2 is set to a larger value as the permissible dischargeable power Wout decreases. As the permissible dischargeable power Wout decreases, the deficiency of electric power in the fuel cell vehicle 20 due to the execution of the power consumption increasing control is suppressed before the power consumption increasing control is terminated. Thus, the generation and consumption of electric power can be balanced.

When the permissible dischargeable power Wout is particularly small, that is, equal to or smaller than the second reference power value $W_2$, the second threshold Th2 is zero, which is the maximum value. When the vehicle power balance value Wa decreases to zero after the start of the power consumption increasing control, the power consumption increasing control can be terminated promptly. Therefore, the deficiency of electric power in the fuel cell vehicle 20 is suppressed when the discharging from the power storage device 650 is difficult. Thus, the generation and consumption of electric power can be balanced. In this embodiment, when the permissible dischargeable power Wout is equal to or smaller than the second reference power value $W_2$, the first threshold Th1 is a maximum positive value $Wa_1$.

In this embodiment, when the permissible dischargeable power Wout is smaller than the first reference power value $W_1$, the electric power of the fuel cell vehicle 20 is excessive unless the vehicle power balance value Wa increases above zero to reach the first threshold Th1 and the power consumption increasing control is started. At this time, the power storage device 650 can be charged with the excess of the electric power of the fuel cell vehicle 20 if the excess is equal to or smaller than the permissible chargeable power Win of the power storage device 650. The excess of the electric power may be reduced through control for reducing the vehicle power balance value Wa. Specifically, it is appropriate to reduce electric power to be generated by the drive motor 170 during the braking. If the electric power to be generated by the drive motor 170 is reduced but the braking force to be generated in the braking-period power generation mode decreases to an impermissible level, it is appropriate, for example, that the controller 200 execute control for increasing braking forces of friction brakes (not illustrated) mounted on the fuel cell vehicle 20.

In FIG. 3, the first reference power value $W_1$, the second reference power value $W_2$, the value $Wa_2$ that is the second threshold Th2 at the permissible dischargeable power Wout equal to the first reference power value $W_1$, and the maximum value $Wa_1$ of the first threshold Th1 at the permissible dischargeable power Wout equal to or smaller than the second reference power value $W_2$ may be set as appropriate in consideration of, for example, an estimated maximum value of the auxiliary device power consumption We of the fuel cell vehicle 20 during braking of the vehicle, an estimated maximum value of the electric power to be generated by the drive motor 170 during the braking, and charging/discharging characteristics of the power storage device 650.

As illustrated in FIG. 3, in this embodiment, the second threshold Th2 is zero, which is the maximum value, when the permissible dischargeable power Wout is equal to or smaller than the second reference power value $W_2$, but a different configuration may be employed. For example, a value larger than zero may be set as the maximum value of the second threshold Th2. With this configuration, the power consumption increasing control is terminated more promptly when the vehicle power balance value Wa decreases after the power consumption increasing control is started while the permissible dischargeable power Wout is relatively small. Thus, it is possible to enhance the effect that the deficiency of electric power is suppressed and the generation and consumption of electric power are balanced.

In this embodiment, the first threshold Th1 and the second threshold Th2 at the permissible dischargeable power Wout smaller than the first reference power value $W_1$ and larger than the second reference power value $W_2$ that is smaller than the first reference power value $W_1$ increase as the permissible dischargeable power Wout decreases. However, a different configuration may be employed. The present disclosure is not limited to the case where the first threshold Th1 and the second threshold Th2 gradually increase as the permissible dischargeable power Wout decreases. It is only necessary that the first threshold Th1 and the second threshold Th2 at the permissible dischargeable power Wout smaller than the first reference power value $W_1$ be larger than the first threshold Th1 and the second threshold Th2 at the permissible dischargeable power Wout equal to or larger than the first reference power value $W_1$, respectively.

In this embodiment, the second threshold Th2 is the constant value $Wa_2$ when the permissible dischargeable power Wout is equal to or larger than the first reference power value $W_1$, but a different configuration may be employed. For example, when the permissible dischargeable power Wout is equal to or larger than the first reference power value $W_1$, the second threshold Th2 may gradually decrease as the permissible dischargeable power Wout increases. When the permissible dischargeable power Wout is large, electric power can easily be supplied from the power storage device 650 even if the vehicle power balance value Wa decreases during the execution of the power consumption increasing control. Further, the effect that the hunting is suppressed can be enhanced by setting a larger hysteresis.

B. Second Embodiment

Figure 5:
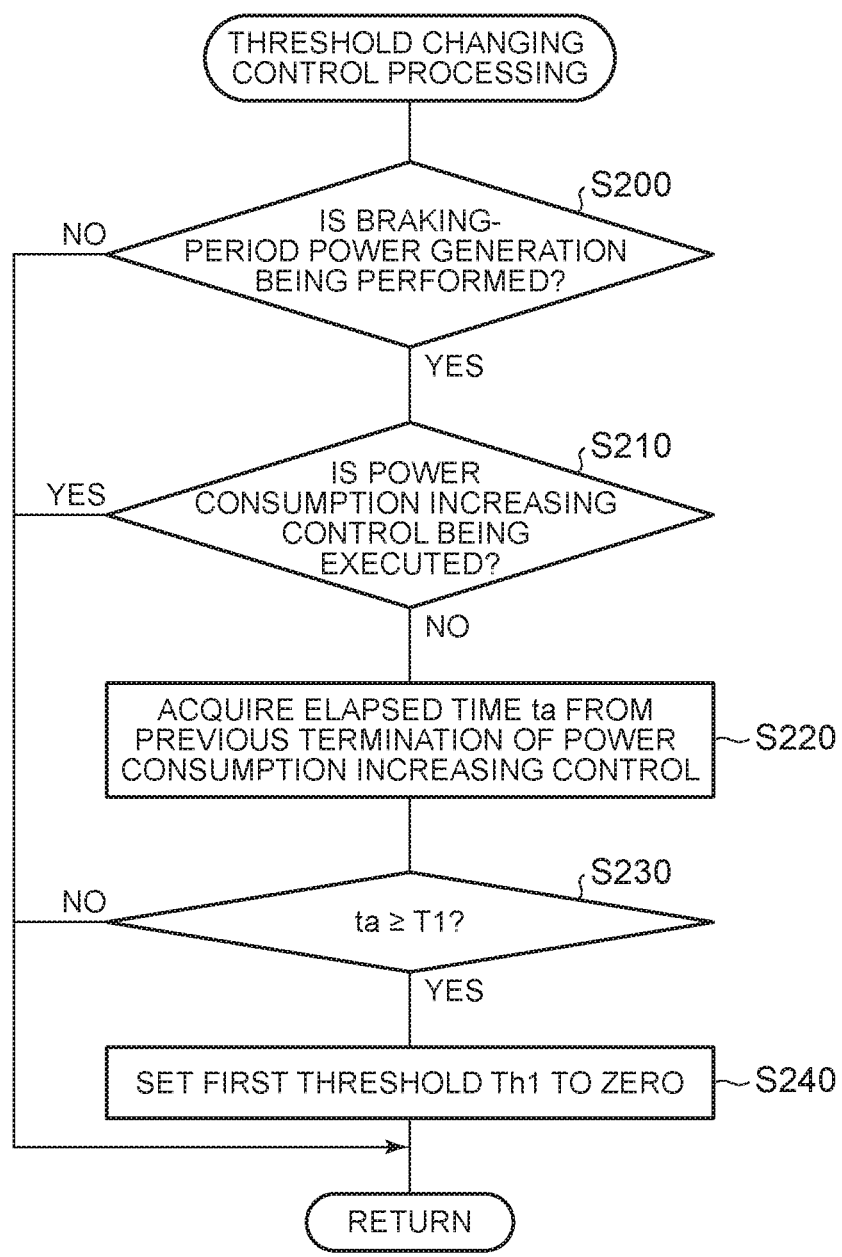
FIG. 5 is a flowchart illustrating a threshold changing control processing routine.

FIG. 5 is a flowchart illustrating a threshold changing control processing routine to be executed by a controller 200 of a fuel cell vehicle 20 according to a second embodiment of the present disclosure. This routine is started when an instruction to start a fuel cell system 30 is input such that the fuel cell vehicle 20 can travel, and is repeated in parallel to the power consumption control processing routine illustrated in FIG. 2 until a stop instruction is input. The fuel cell vehicle 20 of the second embodiment has a configuration similar to that in the first embodiment.

When this routine is started, the CPU of the controller 200 determines whether the fuel cell vehicle 20 is performing the braking-period power generation (Step S200). Step S200 involves the same operation as that in Step S100 of FIG. 2. When determination is made that the braking-period power generation is not being performed (Step S200: NO), the CPU of the controller 200 terminates this routine.

When determination is made in Step S200 that the braking-period power generation is being executed (Step S200: YES), the CPU of the controller 200 determines whether the fuel cell vehicle 20 is already executing the power consumption increasing control (Step S210). When determination is made that the power consumption increasing control is being executed (Step S210: YES), the CPU of the controller 200 terminates this routine.

When determination is made in Step S210 that the power consumption increasing control is not being executed (Step S210: NO), the CPU of the controller 200 acquires an elapsed time to from a previous termination of the power consumption increasing control (Step S220). The controller 200 of this embodiment includes a timer to measure the elapsed time ta from the termination of the power consumption increasing control.

When the elapsed time ta is acquired, the CPU of the controller 200 compares the elapsed time ta with a predetermined first reference time T1 (Step S230). When the elapsed time ta is shorter than the first reference time T1 (Step S230: NO), the CPU of the controller 200 terminates this routine.

When determination is made in Step S230 that the elapsed time ta is equal to or longer than the first reference time T1 (Step S230: YES), the CPU of the controller 200 sets the first threshold Th1 to zero (Step S240), and then terminates this routine. When the first threshold Th1 associated with the permissible dischargeable power Wout at the time of execution of Step S240 is zero (the permissible dischargeable power Wout is equal to or larger than the first reference power value $W_1$), the first threshold Th1 is kept at zero in Step S240. When the first threshold Th1 associated with the permissible dischargeable power Wout at the time of execution of Step S240 is larger than zero (the permissible dischargeable power Wout is smaller than the first reference power value $W_1$), the first threshold Th1 is changed to zero in Step S240. When the first threshold Th1 is changed to zero in Step S240, the power consumption control processing routine of FIG. 2 is subsequently executed by using zero as the first threshold Th1 to determine whether to start the power consumption increasing control.

In this embodiment, when the first threshold Th1 is changed to zero in Step S240, the first threshold Th1 is kept at zero in every execution of the threshold changing control processing routine of FIG. 5 until the power consumption increasing control is started subsequently. When the power consumption increasing control is executed by using the first threshold Th1 that is set to zero, the first threshold Th1 is reset, and the normal control using the map illustrated in FIG. 3 is executed subsequently.

With this configuration, it is possible to reduce the occurrence of a case where the power consumption increasing control is not started and the electric power of the fuel cell vehicle 20 remains excessive because the vehicle power balance value Wa is positive. Specifically, when the power consumption increasing control is not started and the vehicle power balance value Wa remains in a hatched area in FIG. 3, the power consumption increasing control can be started at an elapsed time to reaching the first reference time T1. Thus, even in a case where the vehicle power balance value Wa may remain positive unless the first threshold Th1 is changed to zero in Step S240, an excessive increase in electric power can be suppressed by starting the power consumption increasing control for the power consuming device. The first reference time T1 may be set as appropriate based on, for example, the characteristic of the permissible chargeable power Win of the power storage device 650 or the maximum value $Wa_1$ of the first threshold Th1.

C. Third Embodiment

Figure 6:
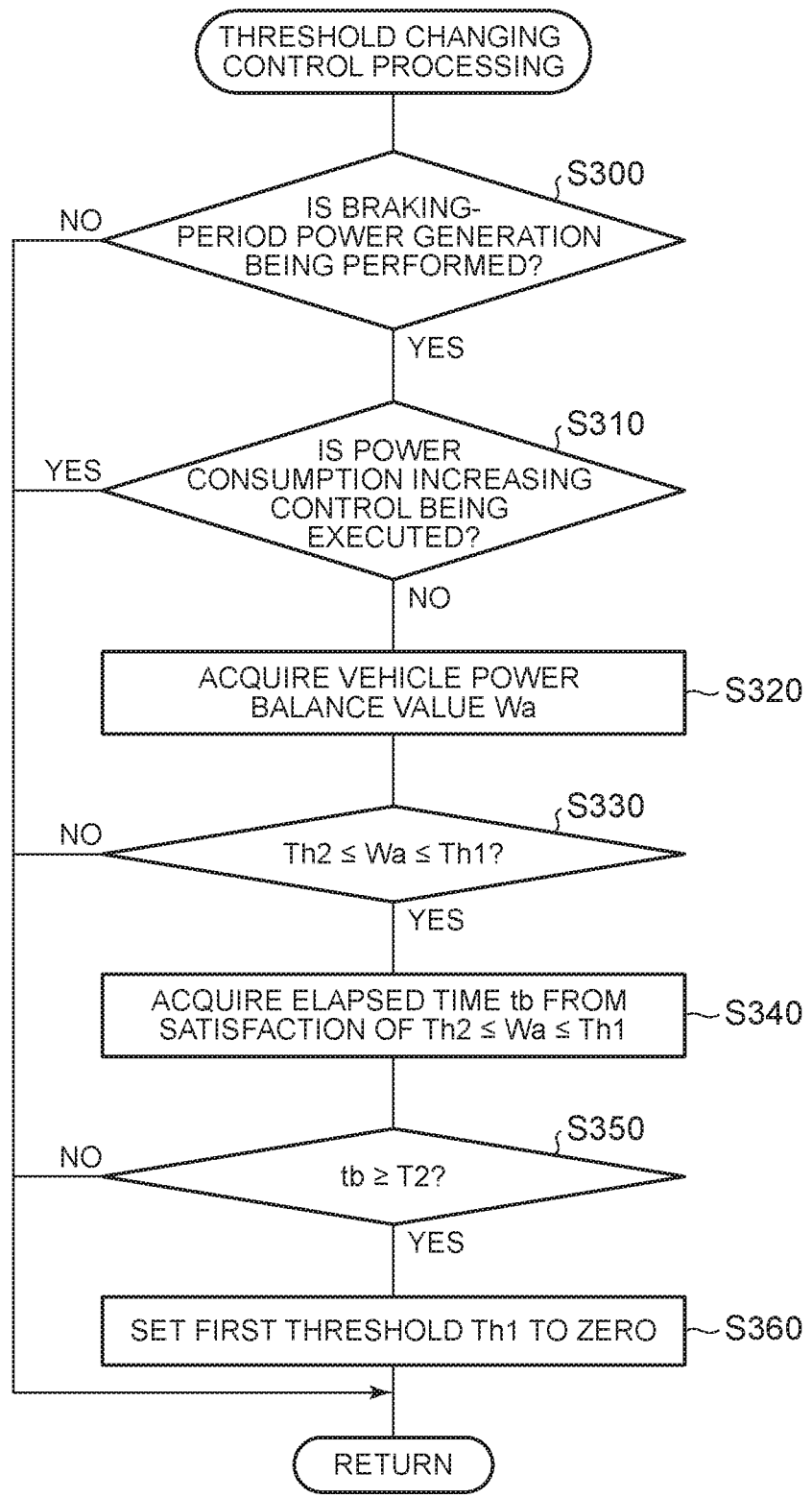
FIG. 6 is a flowchart illustrating a threshold changing control processing routine.

FIG. 6 is a flowchart illustrating a threshold changing control processing routine to be executed by a controller 200 of a fuel cell vehicle 20 according to a third embodiment of the present disclosure. This routine is executed in place of the threshold changing control processing routine of the second embodiment. The fuel cell vehicle 20 of the third embodiment has a configuration similar to that in the first embodiment.

When this routine is started, the CPU of the controller 200 determines whether the fuel cell vehicle 20 is performing the braking-period power generation (Step S300). When determination is made that the braking-period power generation is being performed (Step S300: YES), the CPU of the controller 200 determines whether the fuel cell vehicle 20 is already executing the power consumption increasing control (Step S310). Step S300 and Step S310 are executed similarly to Step S200 and Step S210 of the second embodiment.

When determination is made in Step S310 that the power consumption increasing control is not being executed (Step S310: NO), the CPU of the controller 200 acquires the vehicle power balance value Wa determined from Expression (1) (Step S320). The CPU of the controller 200 determines whether the vehicle power balance value Wa is equal to or larger than the second threshold Th2 and equal to or smaller than the first threshold Th1 (Step S330). When "Th2≤Wa≤Th1" is not satisfied (Step S330: NO), the CPU of the controller 200 terminates this routine.

When "Th2≤Wa≤Th1" is satisfied in Step S330 (Step S330: YES), the CPU of the controller 200 acquires an elapsed time tb indicating continuation of a state in which the power consumption increasing control is not executed and "Th2≤Wa≤Th1" is satisfied (Step S340). The controller 200 of this embodiment includes a timer to measure the elapsed time tb from the satisfaction of "Th2≤Wa≤Th1".

When the elapsed time tb is acquired, the CPU of the controller 200 compares the elapsed time tb with a predetermined second reference time T2 (Step S350). When the elapsed time tb is shorter than the second reference time T2 (Step S350: NO), the CPU of the controller 200 terminates this routine.

When determination is made in Step S350 that the elapsed time tb is equal to or longer than the second reference time T2 (Step S350: YES), the CPU of the controller 200 sets the first threshold Th1 to zero (Step S360), and then terminates this routine. Step S360 involves an operation similar to that in Step S240. When the first threshold Th1 is changed to zero, the power consumption control processing routine of FIG. 2 is subsequently executed by using zero as the first threshold Th1 to determine whether to start the power consumption increasing control.

In this embodiment, when the first threshold Th1 is changed to zero in Step S360, the first threshold Th1 is kept at zero in every execution of the threshold changing control processing routine of FIG. 6 until the power consumption increasing control is started subsequently. When the power consumption increasing control is executed by using the first threshold Th1 that is set to zero, "Th2≤Wa≤Th1" is not satisfied. Therefore, the elapsed time tb and the first threshold Th1 are reset, and the normal control using the map illustrated in FIG. 3 is executed subsequently.

With this configuration, an effect similar to that of the second embodiment can be attained. The second reference time T2 may be set as appropriate based on, for example, the characteristic of the permissible chargeable power Win of the power storage device 650 or the maximum value $Wa_1$ of the first threshold Th1.

D. Fourth Embodiment

Figure 7:
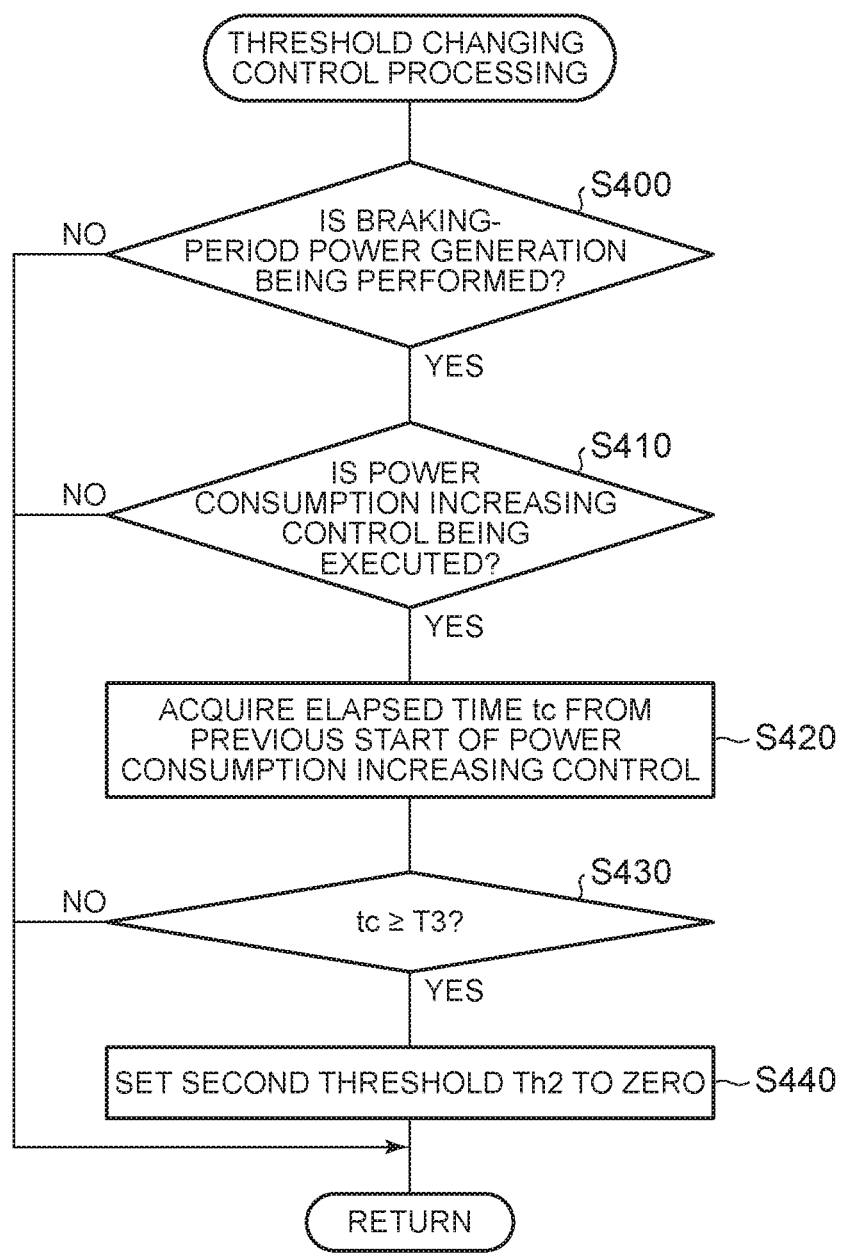
FIG. 7 is a flowchart illustrating a threshold changing control processing routine.

FIG. 7 is a flowchart illustrating a threshold changing control processing routine to be executed by a controller 200 of a fuel cell vehicle 20 according to a fourth embodiment of the present disclosure. This routine is started when an instruction to start a fuel cell system 30 is input such that the fuel cell vehicle 20 can travel, and is repeated in parallel to the power consumption control processing routine illustrated in FIG. 2 until a stop instruction is input. The fuel cell vehicle 20 of the fourth embodiment has a configuration similar to that in the first embodiment.

When this routine is started, the CPU of the controller 200 determines whether the fuel cell vehicle 20 is performing the braking-period power generation (Step S400). When determination is made that the braking-period power generation is being performed (Step S400: YES), the CPU of the controller 200 determines whether the fuel cell vehicle 20 is already executing the power consumption increasing control (Step S410). Step S400 and Step S410 are executed similarly to Step S200 and Step S210 of the second embodiment.

When determination is made in Step S410 that the power consumption increasing control is not being executed (Step S410: NO), the CPU of the controller 200 terminates this routine. When determination is made in Step S410 that the power consumption increasing control is being executed (Step S410: YES), the CPU of the controller 200 acquires an elapsed time tc from a previous start of the power consumption increasing control (Step S420). The controller 200 of this embodiment includes a timer to measure the elapsed time tc from the start of the power consumption increasing control.

When the elapsed time tc is acquired, the CPU of the controller 200 compares the elapsed time tc with a predetermined third reference time T3 (Step S430). When the elapsed time tc is shorter than the third reference time T3 (Step S430: NO), the CPU of the controller 200 terminates this routine.

When determination is made in Step S430 that the elapsed time tc is equal to or longer than the third reference time T3 (Step S430: YES), the CPU of the controller 200 sets the second threshold Th2 to zero (Step S440), and then terminates this routine. When the second threshold Th2 associated with the permissible dischargeable power Wout at the time of execution of Step S440 is zero (the permissible dischargeable power Wout is equal to or smaller than the second reference power value $W_2$), the second threshold Th2 is kept at zero in Step S440. When the second threshold Th2 associated with the permissible dischargeable power Wout at the time of execution of Step S440 is smaller than zero (the permissible dischargeable power Wout is larger than the second reference power value $W_2$), the second threshold Th2 is changed to zero in Step S440. When the second threshold Th2 is changed to zero in Step S440, the power consumption control processing routine of FIG. 2 is subsequently executed by using zero as the second threshold Th2 to determine whether to terminate the power consumption increasing control.

In this embodiment, when the second threshold Th2 is changed to zero in Step S440, the second threshold Th2 is kept at zero in every execution of the threshold changing control processing routine of FIG. 7 until the power consumption increasing control is terminated subsequently. When the power consumption increasing control is terminated by using the second threshold Th2 that is set to zero, the second threshold Th2 is reset, and the normal control using the map illustrated in FIG. 3 is executed subsequently.

With this configuration, it is possible to reduce the occurrence of a case where the power consumption increasing control is not terminated and the electric power of the fuel cell vehicle 20 remains insufficient because the vehicle power balance value Wa is negative. Specifically, when the power consumption increasing control is not terminated and the vehicle power balance value Wa remains negative, the power consumption increasing control can be terminated at an elapsed time tc reaching the third reference time T3. Thus, even in a case where the vehicle power balance value Wa may remain negative unless the second threshold Th2 is changed to zero in Step S440, the deficiency of electric power due to the power consumption of the power consuming device can be suppressed by terminating the power consumption increasing control for the power consuming device. The third reference time T3 may be set as appropriate based on, for example, the characteristic of the permissible dischargeable power Wout of the power storage device 650 or the minimum value $Wa_2$ of the second threshold Th2.

E. Fifth Embodiment

Figure 8:
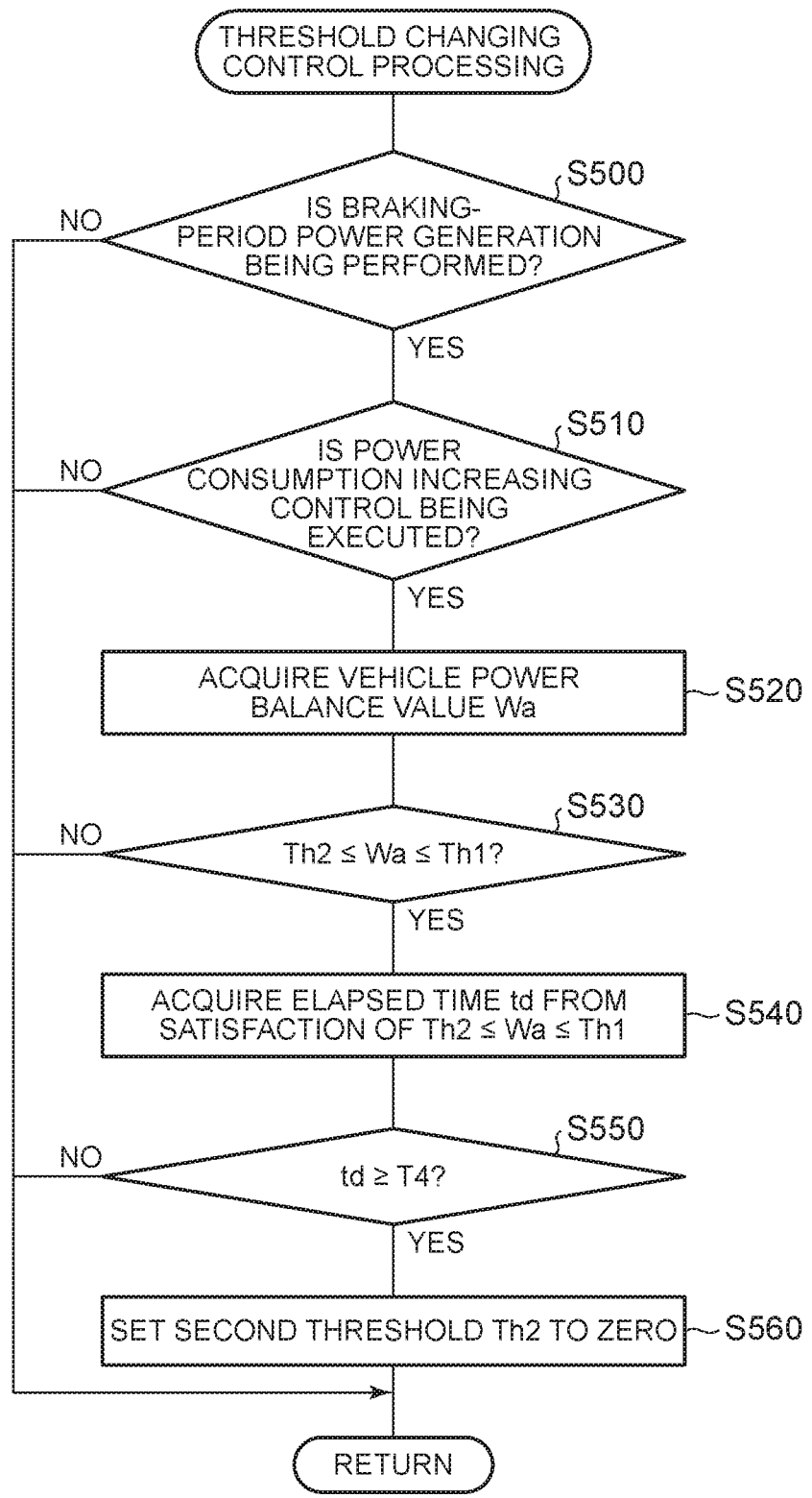
FIG. 8 is a flowchart illustrating a threshold changing control processing routine.

FIG. 8 is a flowchart illustrating a threshold changing control processing routine to be executed by a controller 200 of a fuel cell vehicle 20 according to a fifth embodiment of the present disclosure. This routine is executed in place of the threshold changing control processing routine of the fourth embodiment. The fuel cell vehicle 20 of the fifth embodiment has a configuration similar to that in the first embodiment.

When this routine is started, the CPU of the controller 200 determines whether the fuel cell vehicle 20 is performing the braking-period power generation (Step S500). When determination is made that the braking-period power generation is being performed (Step S500: YES), the CPU of the controller 200 determines whether the fuel cell vehicle 20 is already executing the power consumption increasing control (Step S510). Step S500 and Step S510 are executed similarly to Step S400 and Step S410 of the fourth embodiment.

When determination is made in Step S510 that the power consumption increasing control is being executed (Step S510: YES), the CPU of the controller 200 acquires the vehicle power balance value Wa determined from Expression (1) (Step S520). The CPU of the controller 200 determines whether the vehicle power balance value Wa is equal to or larger than the second threshold Th2 and equal to or smaller than the first threshold Th1 (Step S530). When "Th2≤Wa≤Th1" is not satisfied (Step S530: NO), the CPU of the controller 200 terminates this routine.

When "Th2≤Wa≤Th1" is satisfied in Step S530 (Step S530: YES), the CPU of the controller 200 acquires an elapsed time td indicating continuation of a state in which "Th2≤Wa≤Th1" is satisfied after the start of the power consumption increasing control (Step S540). The controller 200 of this embodiment includes a timer to measure the elapsed time td from the satisfaction of "Th2≤Wa≤Th1" after the start of the power consumption increasing control.

When the elapsed time td is acquired, the CPU of the controller 200 compares the elapsed time td with a predetermined fourth reference time T4 (Step S550). When the elapsed time td is shorter than the fourth reference time T4 (Step S550: NO), the CPU of the controller 200 terminates this routine.

When determination is made in Step S550 that the elapsed time td is equal to or longer than the fourth reference time T4 (Step S550: YES), the CPU of the controller 200 sets the second threshold Th2 to zero (Step S560), and then terminates this routine. Step S560 involves an operation similar to that in Step S440. When the second threshold Th2 is changed to zero, the power consumption control processing routine of FIG. 2 is subsequently executed by using zero as the second threshold Th2 to determine whether to terminate the power consumption increasing control.

In this embodiment, when the second threshold Th2 is changed to zero in Step S560, the second threshold Th2 is kept at zero in every execution of the threshold changing control processing routine of FIG. 8 until the power consumption increasing control is terminated subsequently. When the power consumption increasing control is terminated by using the second threshold Th2 that is set to zero, "Th2≤Wa≤Th1" is not satisfied. Therefore, the elapsed time td and the second threshold Th2 are reset, and the normal control using the map illustrated in FIG. 3 is executed subsequently.

With this configuration, an effect similar to that of the fourth embodiment can be attained. The fourth reference time T4 may be set as appropriate based on, for example, the characteristic of the permissible dischargeable power Wout of the power storage device 650 or the minimum value $Wa_2$ of the second threshold Th2.

F. Other Embodiments (F1) In the embodiments described above, determination is made whether to start or terminate the power consumption increasing control for the power consuming device by using only the permissible dischargeable power Wout as a value indicating the condition of the power storage device 650. A different configuration may be employed. For example, the permissible chargeable power Win may be used as well. Specifically, when determination is made in Step S130 of the power consumption control processing routine of FIG. 2 that the power consumption increasing control is not being executed (Step S130: NO), the vehicle power balance value Wa may be compared with the permissible chargeable power Win. This routine may be terminated when the permissible chargeable power Win is equal to or larger than the vehicle power balance value Wa. The determination of Step S140 may be made when the permissible chargeable power Win is smaller than the vehicle power balance value Wa. The power consumption increasing control may be started when the vehicle power balance value Wa is larger than the first threshold Th1. The operation described above may be performed because, when the permissible chargeable power Win is equal to or larger than the vehicle power balance value Wa, an excessive increase in the electric power of the fuel cell vehicle 20 can be suppressed by charging the power storage device 650 with electric power corresponding to the vehicle power balance value Wa.

(F2) In the embodiments described above, description is given of the operation of the fuel cell vehicle 20 as an example of a hybrid vehicle including a power storage device and an electric generator configured to generate electric power for driving the vehicle as a driving energy source for the vehicle. The present disclosure may be applied to different types of hybrid vehicle. Specifically, the hybrid vehicle may include an internal combustion engine such as an engine and a power generating motor configured to generate electric power by using driving power generated by the internal combustion engine in place of the fuel cell 100 as the electric generator configured to generate electric power for driving the vehicle. Even in this hybrid vehicle, effects similar to those in the respective embodiments are attained as long as control is executed similarly to that in the embodiments for the determination using the vehicle power balance value Wa as to whether to start or terminate the power consumption increasing control for the power consuming device when the electric generator stops generating electric power during braking of the vehicle and the drive motor operates in the braking-period power generation mode.

The present disclosure may be embodied in various forms other than the device. The present disclosure may also be embodied in various forms such as a method for controlling a hybrid vehicle, a computer program for implementing the control method, and a non-transitory recording medium storing the computer program.

The applicable embodiment is not limited to the embodiments described above, but may be embodied by various configurations without departing from the spirit of the present disclosure. For example, the technical features of the embodiments corresponding to the technical features of the respective aspects described in the "SUMMARY" section may be replaced or combined as appropriate to solve a part or all of the problems described above or attain a part or all of the effects described above. Any technical feature may be omitted as appropriate unless it is described as being essential herein.

What is claimed is:

1. A hybrid vehicle comprising:
an electric generator configured to generate electric power for driving the hybrid vehicle;
a drive motor configured to operate in any one of a power running mode in which the drive motor drives the hybrid vehicle and a braking-period power generation mode in which the drive motor generates braking-period electric power by operating as a generator and generates a braking force for the hybrid vehicle;
a power storage device configured to store the electric power generated by the electric generator and the braking-period electric power generated by the drive motor;
a power consuming device configured to consume electric power; and
a controller configured to control driving of the power consuming device, wherein
the controller is configured to execute power consumption increasing control when a vehicle power balance value is larger than a first threshold while the drive motor operates in the braking-period power generation mode,
the vehicle power balance value being a vehicle power balance value that does not include a charging and discharging amount of the power storage device and that is obtained by subtracting vehicle-consuming power consumed by the hybrid vehicle from vehicle-generating power,
the vehicle-generating power being electric power generated by the hybrid vehicle, including an estimated value of the braking-period electric power,
the power consumption increasing control being control for setting power consumption of the power consuming device to be larger than power consumption of the power consuming device at the vehicle power balance value that is smaller than a second threshold set smaller than the first threshold,
the first threshold being preset based on a permissible dischargeable power, which is determined depending on a condition of the power storage device as an upper limit of electric power to be discharged by the power storage device,
the first threshold at the permissible dischargeable power that is smaller than a predetermined first reference power value being set larger than the first threshold at the permissible dischargeable power that is equal to or larger than the first reference power value,
the second threshold at the permissible dischargeable power that is smaller than the first reference power value being set larger than the second threshold at the permissible dischargeable power that is equal to or larger than the first reference power value, and
the controller is configured to terminate the power consumption increasing control when the vehicle power balance value is smaller than the second threshold after a start of the power consumption increasing control.

2. The hybrid vehicle according to claim 1, wherein
the first threshold at the permissible dischargeable power that is smaller than the first reference power value and larger than a second reference power value that is smaller than the first reference power value is set to increase as the permissible dischargeable power decreases, and
the second threshold at the permissible dischargeable power that is smaller than the first reference power value and larger than the second reference power value is set to increase as the permissible dischargeable power decreases.

3. The hybrid vehicle according to claim 1, wherein the controller is configured such that, when a predetermined first reference time elapses without starting the power consumption increasing control after a termination of the power consumption increasing control, the first threshold is set to zero until the power consumption increasing control is started subsequently.

4. The hybrid vehicle according to claim 1, wherein the controller is configured such that, when a predetermined second reference time or longer elapses while the vehicle power balance value remains equal to or larger than the second threshold and equal to or smaller than the first threshold without executing the power consumption increasing control, the first threshold is set to zero until the power consumption increasing control is started subsequently.

5. The hybrid vehicle according to claim 1, wherein the controller is configured such that, when a predetermined third reference time elapses without terminating the power consumption increasing control after a start of the power consumption increasing control, the second threshold is set to zero until the power consumption increasing control is terminated subsequently.

6. The hybrid vehicle according to claim 1, wherein the controller is configured such that, when a predetermined fourth reference time or longer elapses while the vehicle power balance value remains equal to or larger than the second threshold and equal to or smaller than the first threshold under execution of the power consumption increasing control, the second threshold is set to zero until the power consumption increasing control is terminated subsequently.

7. A method for controlling a hybrid vehicle, the hybrid vehicle including an electric generator configured to generate electric power for driving the hybrid vehicle, a drive motor configured to operate in any one of a power running mode in which the drive motor drives the hybrid vehicle and a braking-period power generation mode in which the drive motor generates braking-period electric power by operating as a generator and generates a braking force for the hybrid vehicle, a power storage device configured to store the electric power generated by the electric generator and the braking-period electric power generated by the drive motor, and a power consuming device configured to consume electric power, the method for controlling the hybrid vehicle comprising:

executing power consumption increasing control when a vehicle power balance value is larger than a first threshold while the drive motor operates in the braking-period power generation mode, the vehicle power balance value being a vehicle power balance value that does not include a charging and discharging amount of the power storage device and that is obtained by subtracting vehicle-consuming power consumed by the hybrid vehicle from vehicle-generating power, the vehicle-generating power being electric power generated by the hybrid vehicle, including an estimated value of the braking-period electric power, the power consumption increasing control being control for setting power consumption of the power consuming device to be larger than power consumption of the power consuming device at the vehicle power balance value that is smaller than a second threshold set smaller than the first threshold, the first threshold being preset based on a permissible dischargeable power, which is determined depending on a condition of the power storage device as an upper limit of electric power to be discharged by the power storage device, the first threshold at the permissible dischargeable power that is smaller than a predetermined first reference power value being set larger than the first threshold at the permissible dischargeable power that is equal to or larger than the first reference power value, the second threshold at the permissible dischargeable power that is smaller than the first reference power value being set larger than the second threshold at the permissible dischargeable power that is equal to or larger than the first reference power value; and terminating the power consumption increasing control when the vehicle power balance value is smaller than the second threshold after a start of the power consumption increasing control.

* * * * *